(No Model.)
C. COMSTOCK.
VEHICLE POLE.
No. 279,710. Patented June 19, 1883.
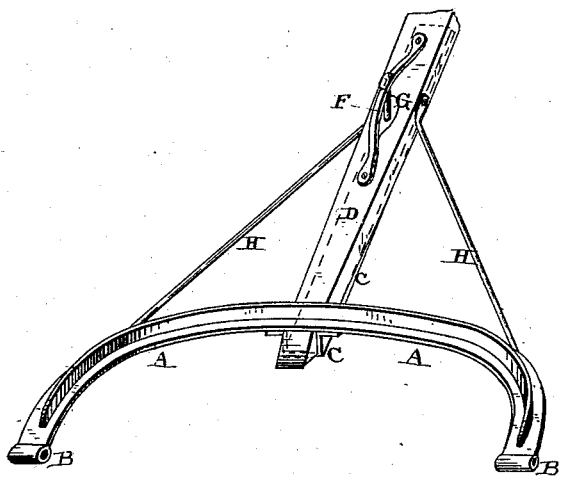
Witnesses.
Louis F. Gardner
E. D. York
Inventor.
Chas. Comstock,
per
F. A. Lehmann,
Atty.

UNITED STATES PATENT OFFICE.

CHARLES COMSTOCK, OF RACINE, WISCONSIN.

VEHICLE-POLE.

SPECIFICATION forming part of Letters Patent No. 279,710, dated June 19, 1883.

Application filed February 28, 1883. (No model.)

*To all whom it may concern:*

Be it known that I, CHARLES COMSTOCK, of Racine, in the county of Racine and State of Wisconsin, have invented certain new and useful Improvements in Poles and Pole-Sweeps for Vehicles; and I do hereby declare the following to be a full, clear, and exact description of the invention, such as will enable others skilled in the art to which it pertains to make and use it, reference being had to the accompanying drawing, which forms part of this specification.

My invention relates to an improvement in pole-sweeps for vehicles; and it consists in a sweep which is made from T-shaped or angle metal, and which has the eyes riveted to or formed in a single piece with it.

It still further consists in a box-shaped loop to receive the rear end of the pole, which loop is riveted or otherwise secured directly to the under side of the sweep, as will be more fully described hereinafter.

The accompanying drawing represents a perspective of my invention complete.

A represents the sweep, which is made of T-shaped or angle iron, bent into any desired shape, according to the form of the sweep desired, and which has the pole-eyes B riveted to or formed in a single piece therewith. By the use of T-shaped iron not only can sweeps having any desired curve be made, but stronger, cheaper, and more easily made sweeps can be produced. Where a curved wooden sweep is being made, a number of sticks will be broken, and then the expense of bracing them is very great. Any blacksmith can make one of my sweeps, while only skilled workmen can make those now in ordinary use. Riveted or otherwise secured to the under side of this sweep is a box-shaped loop, C, through which the rear end of the pole D is passed. The front end of the plate from which this loop is formed extends forward and forms a support upon which the pole rests, and through which the pivotal bolt for the double-tree passes. A plate, G, may be placed upon or sunk into the top of the pole, and a brace, F, may be used in connection with the bolt. Braces H are used to secure the sweep and the pole rigidly together, the rear ends of these braces being riveted or otherwise secured to the sweep, and the front ones clamped to the sides of the pole, as shown. As the bolts which secure the braces to the pole are made readily removable, the pole can be quickly detached from the sweep for the purpose of transportation or repairs, and then the parts again put together without the help of skilled labor.

By the construction above described, any straight stick can be placed in a lathe and turned so as to form a pole—something which has not heretofore been done—and a very light, cheap, and serviceable sweep is produced.

Having thus described my invention, I claim—

1. The combination of the sweep A, made of T-shaped or angle iron, the plate C, which forms both a loop to receive and a support for the tongue, the braces H, and the tongue D, substantially as shown.

2. The combination of the sweep with a box-shaped loop secured thereto, to receive the rear end of the pole, the plate from which the loop is formed being made to form a support for the pole, substantially as set forth.

In testimony whereof I affix my signature in presence of two witnesses.

CHAS. COMSTOCK.

Witnesses:
F. H. BARNARD,
L. H. BEYERLE.